(12) United States Patent
Granzeier (10) Patent No.: US 11,330,933 B2
(45) Date of Patent: May 17, 2022

(54) COLD BREW COFFEE BREWING MACHINE

(71) Applicant: Gregory Sean Granzeier, Roscoe, IL (US)

(72) Inventor: Gregory Sean Granzeier, Roscoe, IL (US)

( * ) Notice: Subject to any disclaimer, the term of this patent is extended or adjusted under 35 U.S.C. 154(b) by 630 days.

(21) Appl. No.: 16/283,744

(22) Filed: Feb. 23, 2019

(65) Prior Publication Data
US 2020/0268196 A1  Aug. 27, 2020

(51) Int. Cl.
*A47J 31/46* (2006.01)
*A47J 31/44* (2006.01)

(52) U.S. Cl.
CPC ........... *A47J 31/467* (2013.01); *A47J 31/446* (2013.01); *A47J 31/468* (2018.08)

(58) Field of Classification Search
CPC ......... A47J 31/005; A47J 31/02; A47J 31/20; A47J 31/24; A47J 31/30; A47J 31/32; A47J 31/38; A47J 31/44; A47J 31/446; A47J 31/467; A47J 31/468; A47J 31/605; A47J 31/4407

USPC ......... 99/287, 292, 297, 303, 306, 308, 322, 99/302 P

See application file for complete search history.

(56) References Cited

U.S. PATENT DOCUMENTS

| | | | |
|---|---|---|---|
| 2006/0260471 A1* | 11/2006 | Adler | A47J 31/32 99/279 |
| 2016/0316957 A1* | 11/2016 | Tran | A23F 3/18 |
| 2020/0060463 A1* | 2/2020 | Gardiner | A47J 31/38 |

* cited by examiner

*Primary Examiner* — Phuong T Nguyen
(74) *Attorney, Agent, or Firm* — Justin Lampel (57) ABSTRACT

A cold brew coffee brewing machine is provided. The cold brew coffee brewing machine may have an upper chamber and a generally identical lower chamber wherein the upper chamber and the lower chamber may be, for example, common mason jars. A filter unit may be secured between the upper chamber and the lower chamber when the coffee brewing machine is in use. A hand pump may be connected to the filter unit and may provide air pressure to the upper chamber. The lower chamber may then be secured to the filter unit and the entire device inverted. Both gravity and air pressure created by the hand pump may be used to force the water through the filter unit so that the drinkable coffee enters the lower chamber.

10 Claims, 7 Drawing Sheets

COLD BREW COFFEE BREWING MACHINE

BACKGROUND OF THE INVENTION

A cold brew coffee brewing machine is provided. The cold brew coffee brewing machine may have an upper chamber and a generally identical lower chamber wherein the upper chamber and the lower chamber may be, for example, common mason jars. A filter unit may be secured between the upper chamber and the lower chamber when the coffee brewing machine is in use. A hand pump may be connected to the filter unit and may provide air pressure to the upper chamber. Coffee grounds and water may be first mixed in the inverted upper chamber and the filter unit may then be secured to the upper chamber. The lower chamber may then be secured to the filter unit and the entire device inverted. Both gravity and air pressure created by the hand pump may be used to force the water through the filter unit so that the drinkable coffee enters the lower chamber.

Cold brewing coffee machines are known. For example, U.S. Pat. No. 8,720,321 to Neace Jr discloses an hourglass shaped apparatus for cold brewing coffee, comprising a brew chamber, and extract chamber and a middle unit connecting the brew and extract chambers. The extract and brew chambers comprise two ends of the hourglass shaped middle unit. The brew chamber houses a free-standing self-contained filter containing coffee grounds inside a water-permeable barrier. Water is poured into the brew chamber to generate coffee extract through cold water infusion. After the brewing process, the apparatus is inverted, and the coffee travels into the extract chamber through the middle unit for dispensing. Coffee brewed in this manner is less acidic and more flavorful than the conventionally hot-brewed beverage. All the components of the apparatus, the filter, the brew chamber, the extract chamber, and the middle unit, are detachable.

Further, U.S. Pat. No. 9,993,011 to Feber discloses a cold brew coffee filtration assembly having a closure. The closure includes a first side and a second side. The first side has a first coupling member configured to couple the closure to a first container. The second side has a second coupling member configured to couple the closure to a second container. A filter is between the first and the second coupling members. A support member supports the filter and defines an air channel extending through the support member and across the filter. A tube is configured to be connected to the support member and extend from the first side of the closure to a bottom of the first container when the first container is coupled to the first side of the closure, the tube further defining the air channel.

Still further, U.S. Publication No. 20160316957 to Tran discloses a method and apparatus to prepare cold brewed beverage from contaminated water. This invention is very useful for people engaged in outdoor activities like hiking, camping or backpacking who find it extremely difficult to either find a supply of potable water or carry pre-packaged beverages. This invention provides for simple means to prepare cold brewed beverage from any source of water "on the go".

However, these patents and publication fail to describe a cold coffee brewing machine which is easy to use and efficient as in the present application. Further, these patents and publications fail to provide for a cold coffee brewing machine which utilizes a hand pump and gravity to brew coffee.

SUMMARY OF THE INVENTION

A cold brew coffee brewing machine is provided. The cold brew coffee brewing machine may have an upper chamber and a generally identical lower chamber wherein the upper chamber and the lower chamber may be, for example, common mason jars. A filter unit may be secured between the upper chamber and the lower chamber when the coffee brewing machine is in use. A hand pump may be connected to the filter unit and may provide air pressure to the upper chamber. Coffee grounds and water may be first mixed in the inverted upper chamber and the filter unit may then be secured to the upper chamber. The lower chamber may then be secured to the filter unit and the entire device inverted. Both gravity and air pressure created by the hand pump may be used to force the water through the filter unit so that the drinkable coffee enters the lower chamber.

An advantage of the present cold brew coffee brewing machine is that the present cold brew coffee brewing machine may allow a user to brew a cold cup of coffee using only gravity in one embodiment.

And an advantage of the present cold brew coffee brewing machine is that the present cold brew coffee brewing machine may allow a user to utilize a hand pump to create air pressure in the cold brew coffee machine to brew a cup of coffee.

Yet another advantage of the present cold brew coffee machine is that, in an embodiment, the present cold brew coffee machine utilizes a two stage filtration process utilizing both a wire mesh filter followed by a paper filter producing a sediment free beverage.

Yet another advantage of the present cold brew coffee brewing machine is that the present cold brew coffee brewing machine is easy to use.

For a more complete understanding of the above listed features and advantages of the cold brew coffee brewing machine reference should be made to the detailed description and the drawings. Further, additional features and advantages of the invention are described in, and will be apparent from, the detailed description of the preferred embodiments.

DETAILED DESCRIPTION OF THE PREFERRED EMBODIMENTS

A cold brew coffee brewing machine is provided. The cold brew coffee brewing machine may have an upper chamber and a generally identical lower chamber wherein the upper chamber and the lower chamber may be, for example, common mason jars. A filter unit may be secured between the upper chamber and the lower chamber when the coffee brewing machine is in use. A hand pump may be connected to the filter unit and may provide air pressure to the upper chamber. Coffee grounds and water may be first mixed in the inverted upper chamber and the filter unit may then be secured to the upper chamber. The lower chamber may then be secured to the filter unit and the entire device inverted. Both gravity and air pressure created by the hand pump may be used to force the water through the filter unit so that the drinkable coffee enters the lower chamber.

Figure 3:
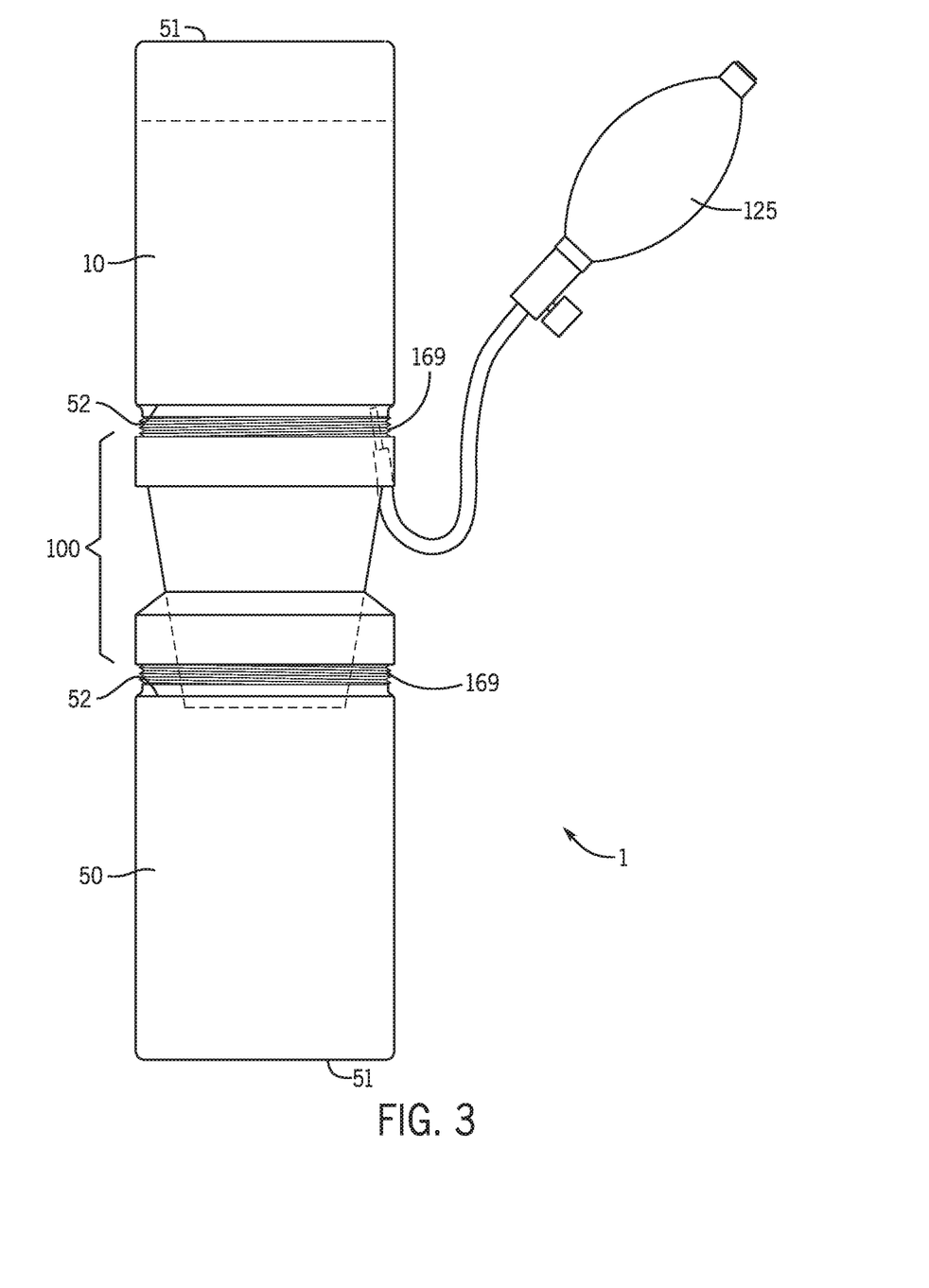
FIG. 3 illustrates a side view of the fully assembled cold brew coffee brewing machine in an embodiment.

Referring first to FIG. 3, in an embodiment, a cold brew coffee brewing machine 1 is provided. The cold brew coffee brewing machine 1 may have at least three units: an upper chamber 10, a lower chamber 50 and a filter unit 100. In an embodiment, the upper chamber 10 and the lower chamber 50 may be substantially similar or identical so that the two chambers 10, 50 are interchangeable. Preferably, the upper chamber 10 and the lower chamber 50 are made of a durable material such as plastic or glass.

Figure 4:
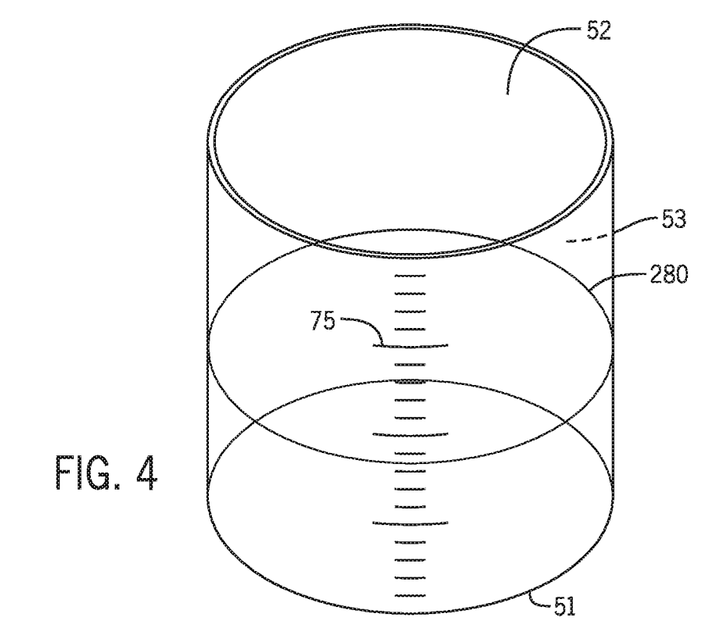
FIG. 4 illustrates a perspective view of the upper chamber or the identical lower chamber isolated from the other elements of the device.

In an embodiment, both the upper chamber 10 and the lower chamber 50 may each have a closed bottom 51 (FIG. 4), an open top 52 and an interior 53. In one embodiment, the upper chamber 10 and the lower chamber 50 may have indicia 75 such as, for example, volume line markers so that a user can measure the amount of a liquid 280 located within the upper chamber 10 or lower chamber 50.

Figure 1:
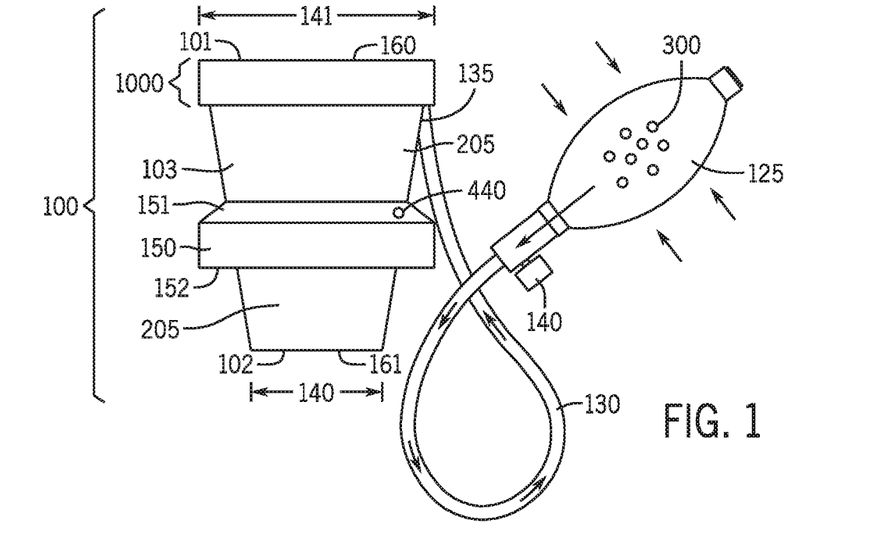
FIG. 1 illustrates a side view of the filter unit in an embodiment.

Referring now to FIG. 1, in an embodiment the filter unit 100 may have a top end 101, a bottom end 102 and a side 103. In one embodiment, the side 103 may be slightly cone-shaped so that, for example, the bottom end 102 of the filter unit 100 has a smaller diameter 140 than a diameter 141 of the top 101 of the filter unit 100. The filter unit 100 may have a middle section 150 having a top 151 and a bottom 152. The top 151 of the middle section 150 may be tapered downward. Further, in an embodiment, the middle section 150 is rigid. In an embodiment, the top 101 of the filter unit 100 may have a threaded member 268 (FIG. 5) above an opening 267 to the cone-shaped funnel 205 (as described below).

An opening 160 may be located at the top 101 of the filter unit 100 and an opening 161 may be present on the bottom 102 of the filter unit 100 such that the liquid 280 may pass from completely through the filter unit 100 during use. A hole 135 may be located at, for example, an upper section 1000 of the filter unit 100. The hole 135 may be connected to a bendable hose 130 which may terminate at a hand pump 125 or may be directly connected to the hand pump 125. The hand pump 125, when squeezed by a user, may force air 300 through the bendable hose 130 and into the upper chamber 10 during use. As a result, the upper chamber 10 has a greater air pressure than the lower chamber 50 and liquid is therein forced downward. An optional adjustable knob 140 connected to the hand pump 125 may allow a user to control the flow of air 300 through the bendable hose 130.

In one embodiment, a vent hole 440 (FIG. 2) may be located on the filter unit 100. The vent hole 440 may be located on the top 151 of the middle section of the filter unit 100 wherein air 300 is introduced into the device 1 from the hand pump 125. Once the hand pump 125 is activated, the increased air pressure 300 introduced into the upper chamber 10 must pass through the filter unit 100 and in order to exit the device 1 through the vent 440. The vent 440 may therein release pressure from the lower chamber 50. The air pressure 300 therein forces the liquid 280 from the upper chamber 10 to the lower chamber 50 while first passing through the filter unit 100.

Figure 5:
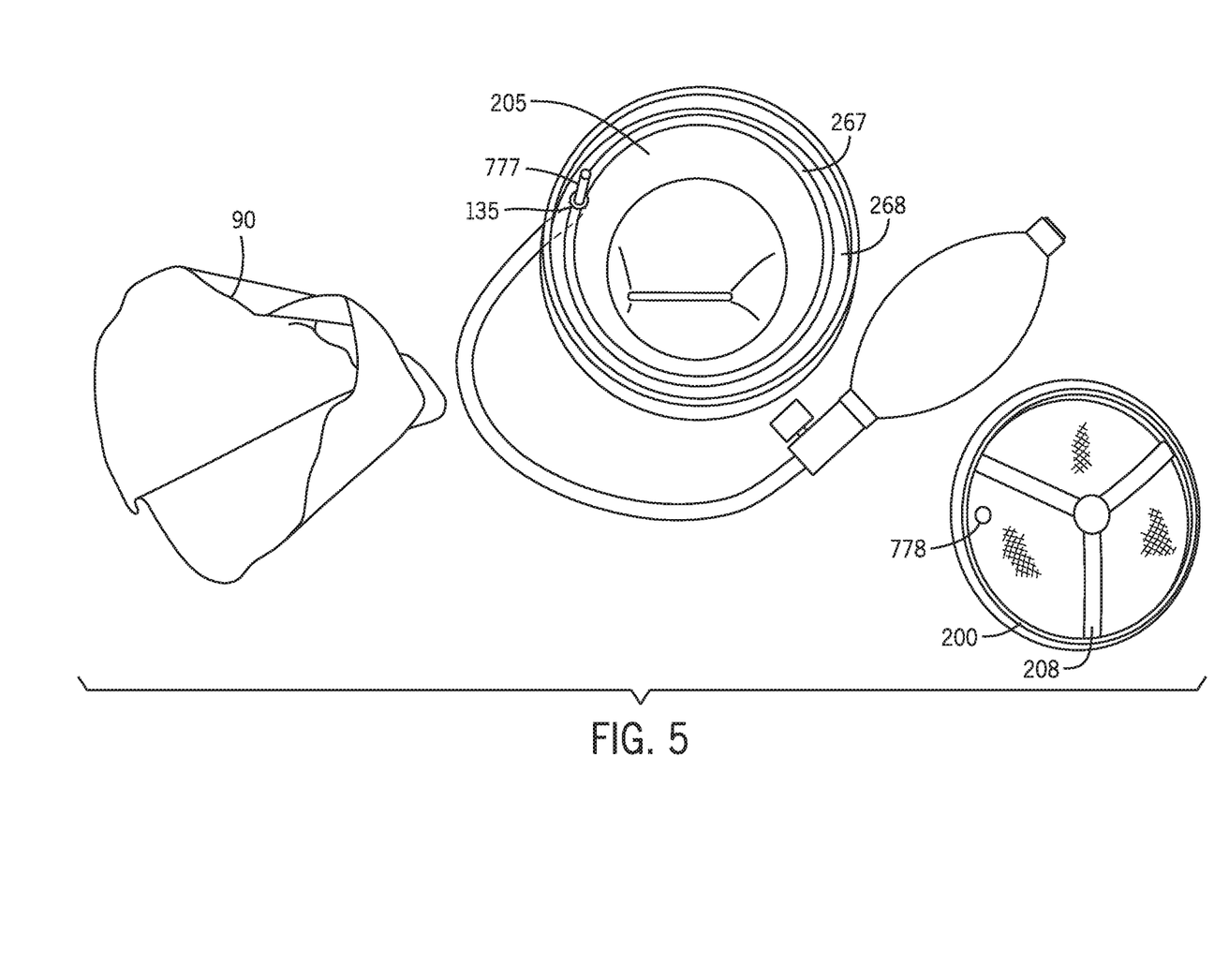
FIG. 5 illustrates a top view of the filter unit wherein the screen is separated from the funnel portion of the filter unit.
Figure 6:
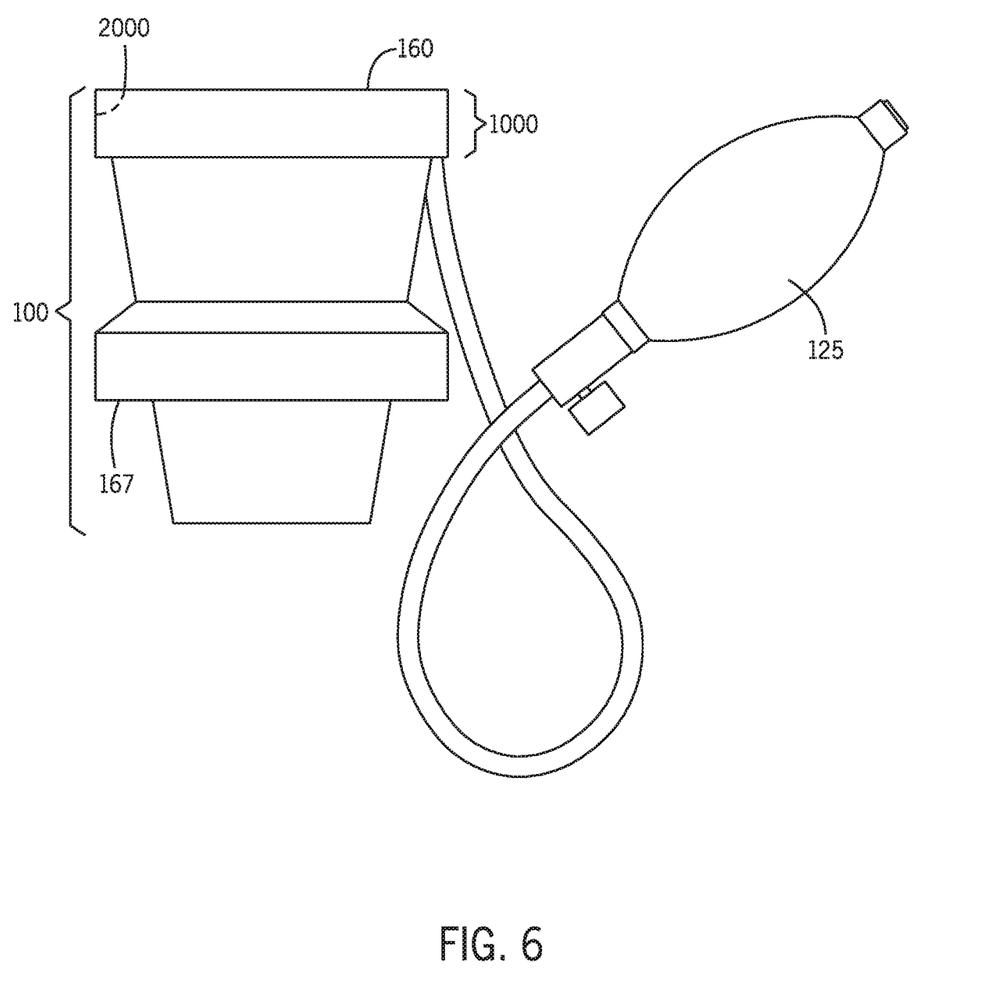
FIG. 6 illustrates a side view of the filter unit secured to the hand pump.
Figure 9:
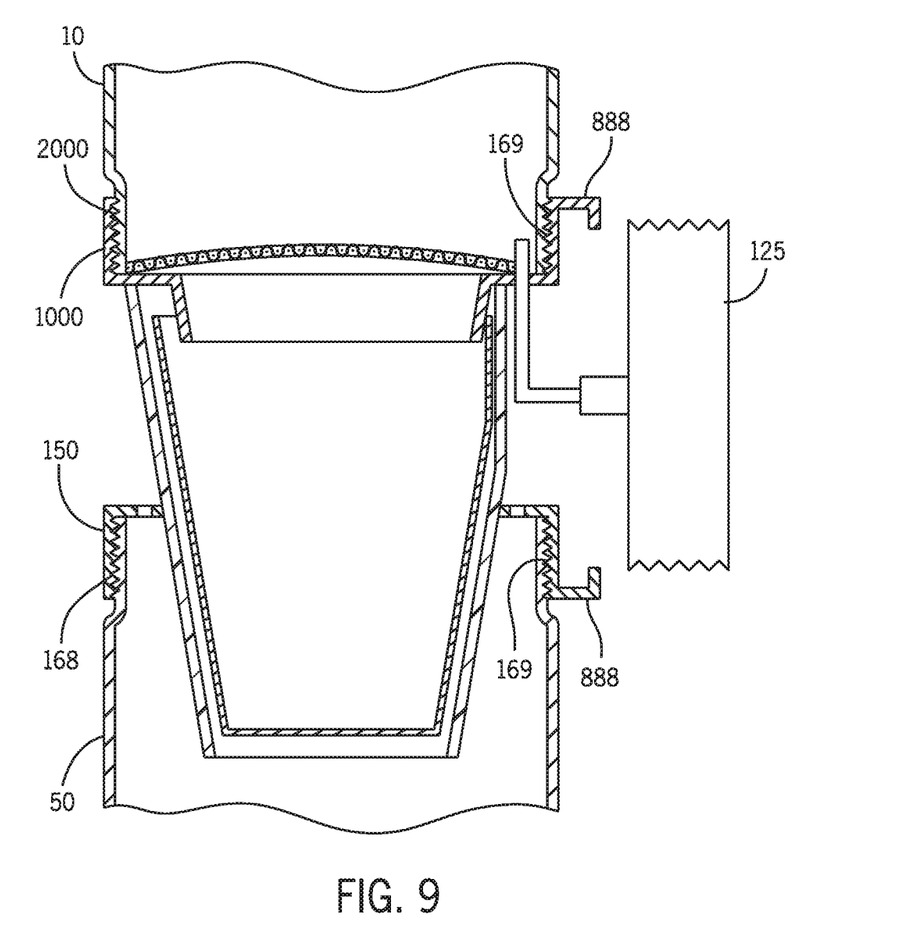
FIG. 9 illustrates a side view of the filter unit wherein the hand pump securing mechanism is shown.

Referring now to FIGS. 5 and 6, in an embodiment, the bottom 152 of the middle section 150 of the filter unit 100 may have an opening 167. Within the opening 167 of the bottom 152 of the middle section 150 may be a threaded member 168. The threaded member 168 may correspondingly mate with a second threaded member 169 located at the top 52 of the lower chamber 10 (or identical upper chamber). The upper section 1000 of the filter unit 100 may have an opening 160. Within the opening 160 on upper section 1000 of the filter unit 100 may be second threaded member 2000 (FIG. 9). The second threaded member 2000 may correspondingly mate with a second threaded member 169 located at the top of the upper chamber 10. More specifically, during use, a user may first temporarily lock the filter unit 100 to the upper chamber 10 and then the lower chamber 50.

Figure 7:
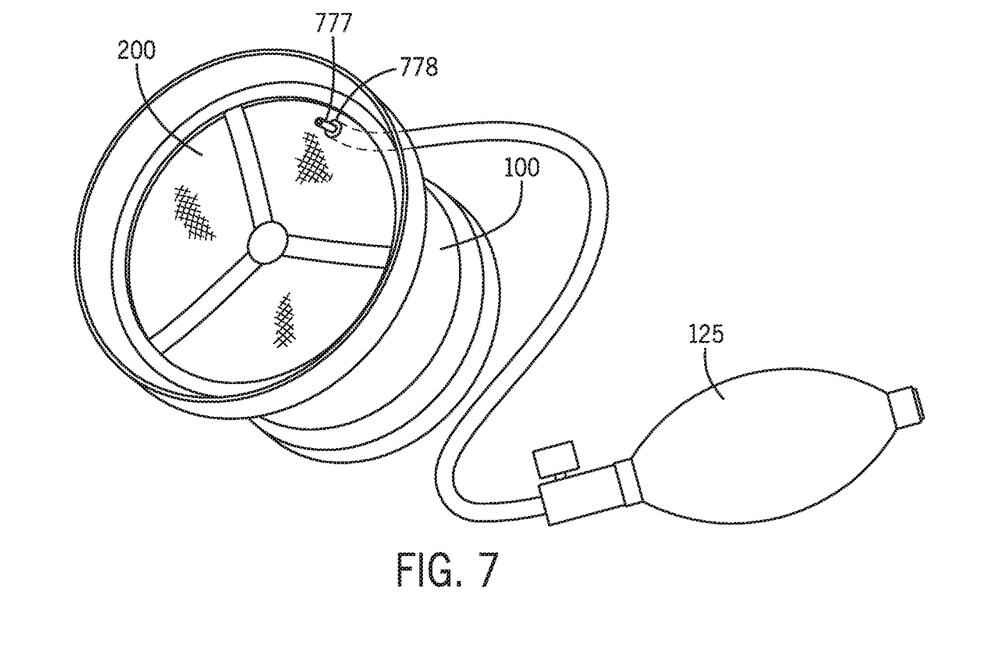
FIG. 7 illustrates a perspective view of the filter unit.

In an embodiment, the funnel unit 205 (FIG. 5) may have a conduit 777 wherein the bendable hose 130 terminates at the opening 135. More specifically, the conduit 777 may allow the forced air 300 to enter the upper chamber 10 from the hand pump 125. In an embodiment, the filter unit 100 may have an optional removable screen unit 200 and a funnel section 205. In an embodiment, the screen unit 200 may be, for example, a wire mesh. The screen unit 200 may be, for example, generally flat having a brace 208 which supports the screen unit 200. The screen unit 200 may be removable from the funnel unit 205. The screen unit 200 may have an opening 778 (FIG. 7) to allow a conduit 777 attached to the hand pump 125 hose 130 to pass through and be properly aligned. The funnel unit 205 may be cone-shaped and may extend the entire length of the filter unit 100, passing through the middle section 150. The funnel unit 205 may be made of a durable material.

Figure 2:
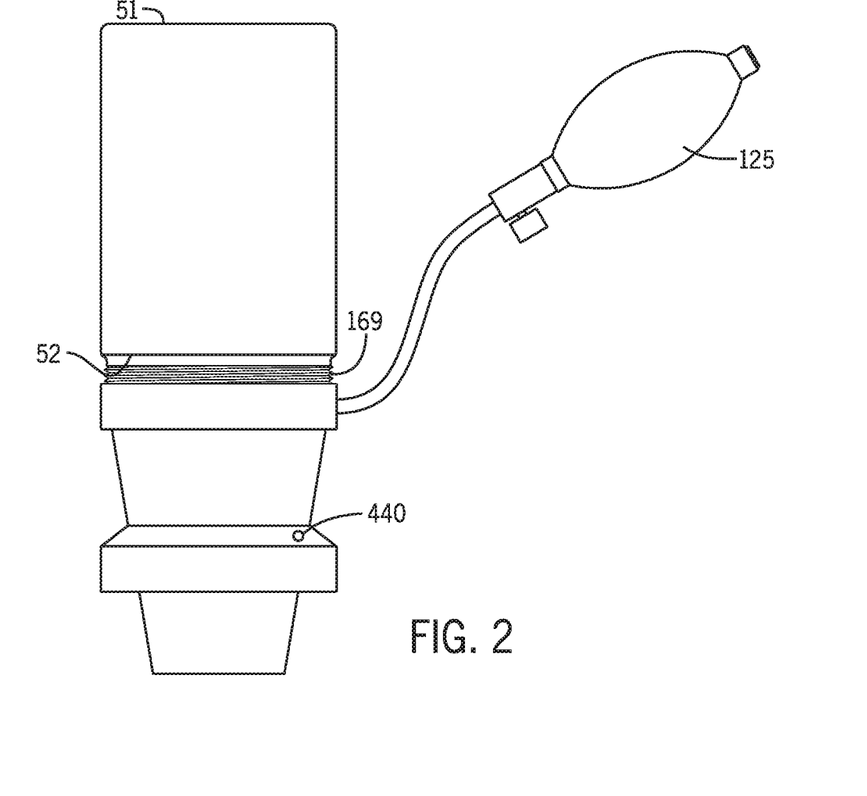
FIG. 2 illustrates a side view of the filter unit attached to the upper chamber in an embodiment.
Figure 8:
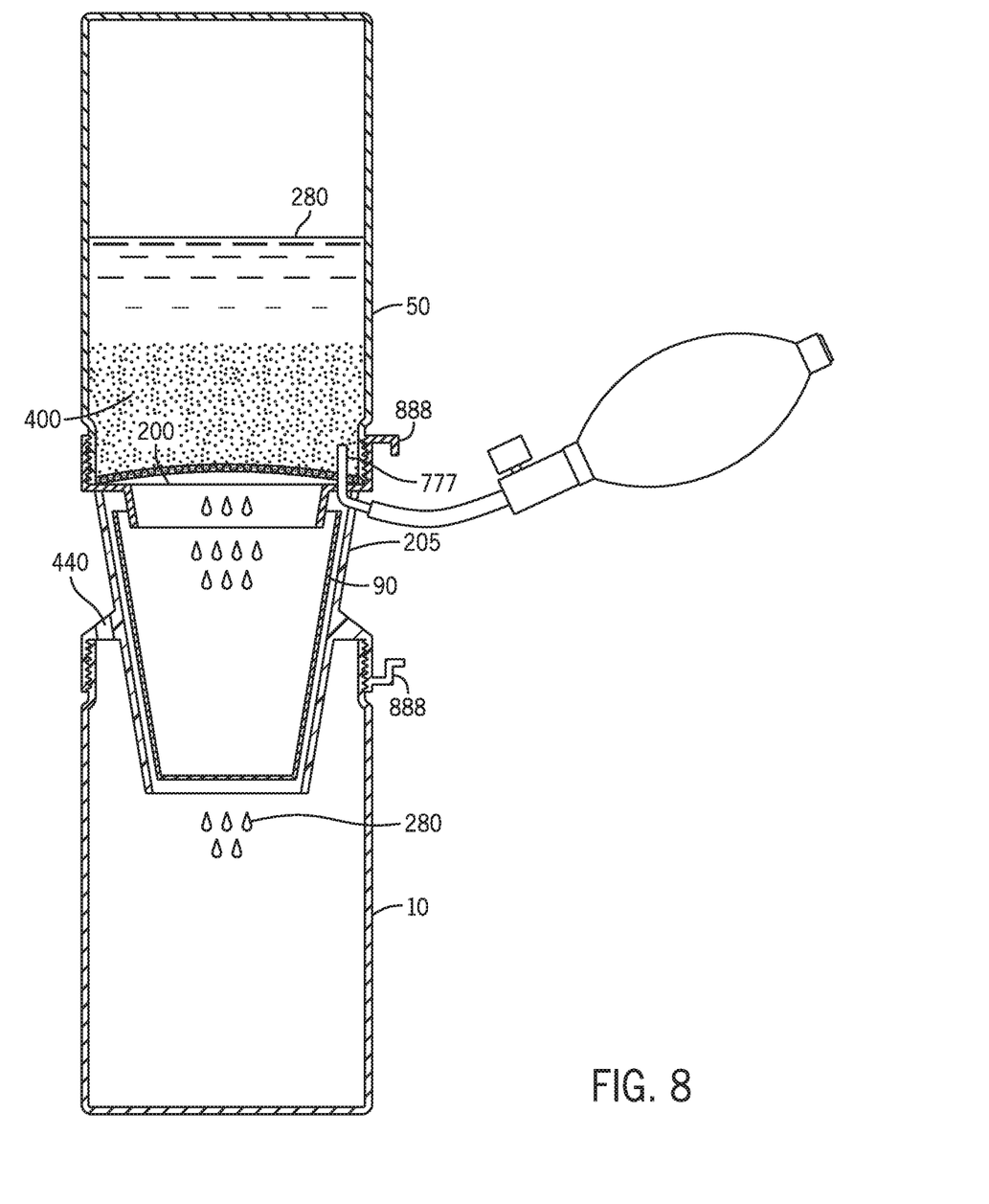
FIG. 8 illustrates a cross sectional view of the fully assembled cold brew coffee brewing machine.

During use, coffee grounds 400 and water (which combine to form the liquid 280) and may be first added and lightly mixed in the upper chamber 10. An additional optional disposable paper filter 90 (FIGS. 5 and 8) may then be placed within the cone-shaped funnel unit 205 of the filter unit 100 and the screen 200 then inserted into the cone-shaped funnel unit 205. In an embodiment, the filter unit 100, having the optional disposable paper filter 90 attached, may then be secured to the upper chamber 10 as is shown in FIG. 2 by use of the threaded member mating 168, 169. The empty lower chamber 50 may then be secured to the bottom end 102 of the filter unit 100 so that all three units 10, 100 and 50 are secured together. The entire device 1 may then be inverted, as shown in FIG. 8. Although FIG. 2 shows the proper attachment, one would first secure the filter unit 100 to the upper chamber 10 in an inverted manner than shown in FIG. 2 to avoid spilling.

As the coffee-water liquid mix 280 is pulled downward, via gravity, the coffee-water liquid mix 280 first passes through the screen unit 200 and the funnel unit 205 and drips into the empty lower chamber 50. The screen 200 and the optional paper filter 90 may prevent undissolved coffee grounds 400 from entering the lower chamber 50. During the drip, a user may electively utilize the hand pump 125 to add air pressure 300 to the upper chamber 10 so that the increased air pressure 300 forces the coffee-water liquid mix 280 down through the filter unit 100 faster than mere gravity would otherwise force the coffee-water liquid mix 280 downward. As the coffee-water liquid mix 280 passes into the lower chamber 50, only drinkable coffee is left in the lower chamber 50. Cold, warm or hot coffee may be made using this device 1.

In one embodiment, the side of the filter unit 100 may have at least one optional securing mechanism 333 (FIGS.

8 and 9). The optional securing mechanism(s) 888 may be, for example, a hook which allows a user to secure the hose 130 of the hand pump 125 to the device 1 so that the hose 130 is neatly stored next to the device 1 either during use or during storage. Further, in an alternative embodiment as shown in FIG. 9, the securing mechanism 888 may allow a user to directly secure the hand pump 125 in an embodiment wherein the bendable hose is not utilized. In this embodiment, the hand pump 125 may simply slide into the securing mechanism(s) 888 of the device 1 and may therein be attached and secured directly to the device 1 and may be active without the need for a hose.

The securing mechanism 888 may be attached to the exterior side wall of the filter unit 100 and may secure the hand pump 125 in an elevated manner so that the hand pump 125 does not contact the surface the device 1 is sitting on. Further, the filter unit 100 may have two securing mechanisms 888 as is shown in the figures. The securing mechanism 888 may be opposing, having a mirror orientation to each other so as to better secure the hand pump 125 by either sliding the hand pump 125 in between the two securing mechanisms 888 or to wrap the hose 130 (in the hose 130 embodiment) around the two securing mechanisms 888.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

I claim:

1. A coffee brewing machine comprising:
   a first chamber having a top having an opening, a bottom, a side, a generally hollow interior;
   a second chamber having a top having an opening, a bottom, a side, a generally hollow interior;
   a filter unit housing which receives a coffee filter wherein the filter unit housing is removably secured between the first chamber and the second chamber;
   wherein the filter unit housing has a top, a bottom, a side and a generally hollow interior;
   a first hole on the side of the filter unit housing for receiving air from a hand air pump and a second hole on the side of the filter unit housing for venting air from within the hollow interior of the first chamber or second chamber and wherein the first hole and the second hole are on opposing sides of the coffee filter.

2. The coffee brewing machine of claim 1 wherein the filter unit housing is cone-shaped.

3. The coffee brewing machine of claim 1 further comprising:
   a second filter located within the generally hollow interior of the filter unit housing wherein the second filter is made of paper.

4. The coffee brewing machine of claim 1 further comprising:
   a hose connecting the hand pump to the filter unit housing.

5. The coffee brewing machine of claim 4 wherein the hose is bendable.

6. The coffee brewing machine of claim 1 wherein the first chamber and the second chamber are identical.

7. The coffee brewing machine of claim 1 wherein the hand pump creates a higher air pressure in the first chamber than the air pressure second chamber therein forcing a liquid to pass through the filter unit housing.

8. The coffee brewing machine of claim 1 wherein the filter unit housing is secured to the first chamber by a threaded member securing assembly.

9. The coffee brewing machine of claim 1 wherein the filter unit housing is secured to the second chamber by a threaded member securing assembly.

10. The coffee brewing machine of claim 1 wherein a liquid is passed from the first chamber through the filter unit housing and then into the second chamber by gravity.

* * * * *